(12) United States Patent
Inoue et al.

(10) Patent No.: US 6,460,669 B2
(45) Date of Patent: Oct. 8, 2002

(54) POWER DRIVING DEVICE

(75) Inventors: Eiji Inoue; Hidetaka Koga; Atsushi Yanazaki; Takefumi Okamoto, all of Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 45 days.

(21) Appl. No.: 09/778,918

(22) Filed: Feb. 8, 2001

(65) Prior Publication Data

US 2001/0017248 A1 Aug. 30, 2001

(30) Foreign Application Priority Data

Feb. 28, 2000 (JP) ........................................ 2000-052010

(51) Int. Cl.$^7$ .............................................. F16H 41/22
(52) U.S. Cl. .................................. 192/3.21; 192/87.11
(58) Field of Search ............................. 192/3.21, 3.63, 192/57, 35, 87.11, 85 A (56) References Cited

U.S. PATENT DOCUMENTS

| | | |
|---|---|---|
| 3,537,262 A | 11/1970 | Briski |
| 3,561,367 A * | 2/1971 | Black ........................ 105/61.5 |
| 3,752,012 A | 8/1973 | Ross et al. |
| 4,079,820 A * | 3/1978 | Mattli ....................... 192/3.21 |
| 4,785,923 A | 11/1988 | Ushijima |
| 6,374,972 B1 * | 4/2002 | Yoshimoto et al. ........ 192/3.21 |

FOREIGN PATENT DOCUMENTS

| | | |
|---|---|---|
| GB | 1602398 | 11/1981 |
| JP | 55164730 | 12/1980 |

* cited by examiner

Primary Examiner—Saúl Rodríguez
(74) Attorney, Agent, or Firm—Antonelli, Terry, Stout & Kraus, LLP (57) ABSTRACT

A power driving device comprises a fluid coupling operated by an engine, a wet-type friction clutch disposed between said fluid coupling and a transmission, and a fluid operation means for circulating the operation fluid through said fluid coupling and for feeding the operation fluid to the wet-type friction clutch. In the pump housing of the fluid operation means, there is disposed a hydraulic pump that works as a source of hydraulic pressure, there are formed passages for communicating said hydraulic pump with said fluid coupling and with said wet-type friction clutch, and there are disposed a relief valve for adjusting the pressure of the operation fluid blown out from the hydraulic pump, a control valve for changing over the passage communicated with the fluid coupling and a control valve for changing over the passage communicated with the wet-type friction clutch.

3 Claims, 5 Drawing Sheets

POWER DRIVING DEVICE

FIELD OF THE INVENTION

The present invention relates to a power driving device and, more particularly, to a power driving device comprising a fluid coupling operated by an engine and a friction clutch disposed between the fluid coupling and a transmission.

DESCRIPTION OF THE PRIOR ART

A running gear for vehicles, which has a fluid coupling disposed in a drive system for absorbing rotational fluctuation and vibration of the engine, has been disclosed in, for example, Japanese Laid-open Patent Publication (Kokai) No. 164730/1980 (JP-A 55-164730). In the running gear for vehicles equipped with the fluid coupling, an engine mounted on the vehicle, the fluid coupling, a dry-type single-plate friction clutch and a transmission are arranged in series. The fluid coupling employed by the power driving device for vehicles includes a casing coupled to a crank shaft (input shaft as a fluid coupling) of, for example, a diesel engine, a pump disposed being opposite to the casing and mounted on the casing, and a turbine disposed being opposite to the pump and mounted on an output shaft arranged on the same axis as the input shaft, and an operation fluid for transmitting the torque is contained therein. The operation fluid generates heat as it circulates in the operation chamber formed by the pump and the turbine. In the fluid coupling disclosed in the above publication, therefore, the operation fluid is cooled by the air. There has also been employed a fluid coupling device of the operation fluid circulation type which radiates the heat by circulating the operation fluid.

There has been also proposed a fluid coupling equipped with a lock-up clutch which directly couples the input shaft and the output shaft together by bringing the casing into frictional engagement with the turbine. The lock-up clutch has a clutch disk which is placed between the casing and the turbine to form an outer chamber relative to the casing and to form an inner chamber relative to the turbine, and it is so constituted that the casing is engaged with, or disengaged from, the turbine by utilizing a pressure differential of the operation fluid circulating in the fluid coupling between the inner chamber side and the outer chamber side. In the fluid coupling equipped with this lock-up clutch, the direction of circulation of the operation fluid circulating in the fluid coupling is changed depending upon whether the lock-up clutch is in operation or not in operation.

A dry-type single-plate clutch is generally used as a friction clutch that is placed between the fluid coupling and the transmission. Meanwhile, use of a wet-type friction clutch may be conceivable in view of frictional wear of a clutch facing. When the wet-type friction clutch is used, an operation fluid is necessary for operating the clutch. The above-mentioned fluid coupling and the wet-type friction clutch are disposed in the housing.

The above-mentioned power driving device must be equipped with a fluid operation means for feeding the operation fluid that circulates through the fluid coupling and for feeding the operation fluid to the wet-type friction clutch. The fluid operation means includes a hydraulic pump which is a source of hydraulic pressure, a fluid passage for communicating the hydraulic pump with the fluid coupling and with the wet-type friction clutch, a relief valve for adjusting the pressure of the operation fluid blown out from the hydraulic pump, a control valve for changing over the fluid passage communicated with the fluid coupling, and a control valve for changing over the fluid passage communicated with the wet-type friction clutch. If piping such as pipes are used, the fluid operation means having these hydraulic pump, relief valve, control valves and fluid passage becomes too lengthy, requires a large space and extra amounts of operation fluid, and requires an increased number of parts and increased number of steps for assembly. It is therefore desired that the fluid operation means has a short fluid passage and is constituted in a compact size without using piping such as pipes.

SUMMARY OF THE INVENTION

It is therefore an object of the present invention to provide a power driving device which makes it possible to compactly constitute fluid operation means that circulates the operation fluid through the fluid coupling and that feeds the operation fluid to the wet-type friction clutch.

In order to solve the above-mentioned principal technical assignment according to the present invention, there is provided a power driving device comprising a fluid coupling having a pump operated by an engine and a turbine disposed being opposite to said pump, a wet-type friction clutch placed between said fluid coupling and a transmission, and a fluid operation means for circulating the operation fluid through said fluid coupling and for feeding the operation fluid to said wet-type friction clutch, said power driving device further comprising:

a coupling housing including a fluid coupling-holding chamber in which said fluid coupling is disposed and a friction clutch-holding chamber in which said friction clutch is disposed; and a pump housing disposed in said coupling housing to partition said fluid coupling-holding chamber from said friction clutch-holding chamber;

wherein, in said pump housing, there is disposed a hydraulic pump that is driven by said pump of said fluid coupling and works as a source of hydraulic pressure for said fluid operation means, there are formed passages for communicating said hydraulic pump with said fluid coupling and with said wet-type friction clutch, and there are disposed a relief valve for adjusting the pressure of the operation fluid blown out from the hydraulic pump, a control valve for changing over the passage communicated with said fluid coupling and a control valve for changing over the passage communicated with said wet-type friction clutch.

It is desired that the relief valve and the control valves are disposed in the outer circumferential portions of the pump housing on the outer side of the outer circumference of the wet-type friction clutch in the radial direction. It is further desired that the relief valve and the control valves are constituted by spool valves comprising cylinder bores and spools slidably disposed in the cylinder bores, the cylinder bores being so formed that the axial directions thereof are perpendicular to the radial direction of the pump housing.

DETAILED DESCRIPTION OF THE PREFERRED EMBODIMENTS

A preferred embodiment of a power driving device constituted according to the present invention will now be described in detail with reference to the accompanying drawings.

Figure 1:
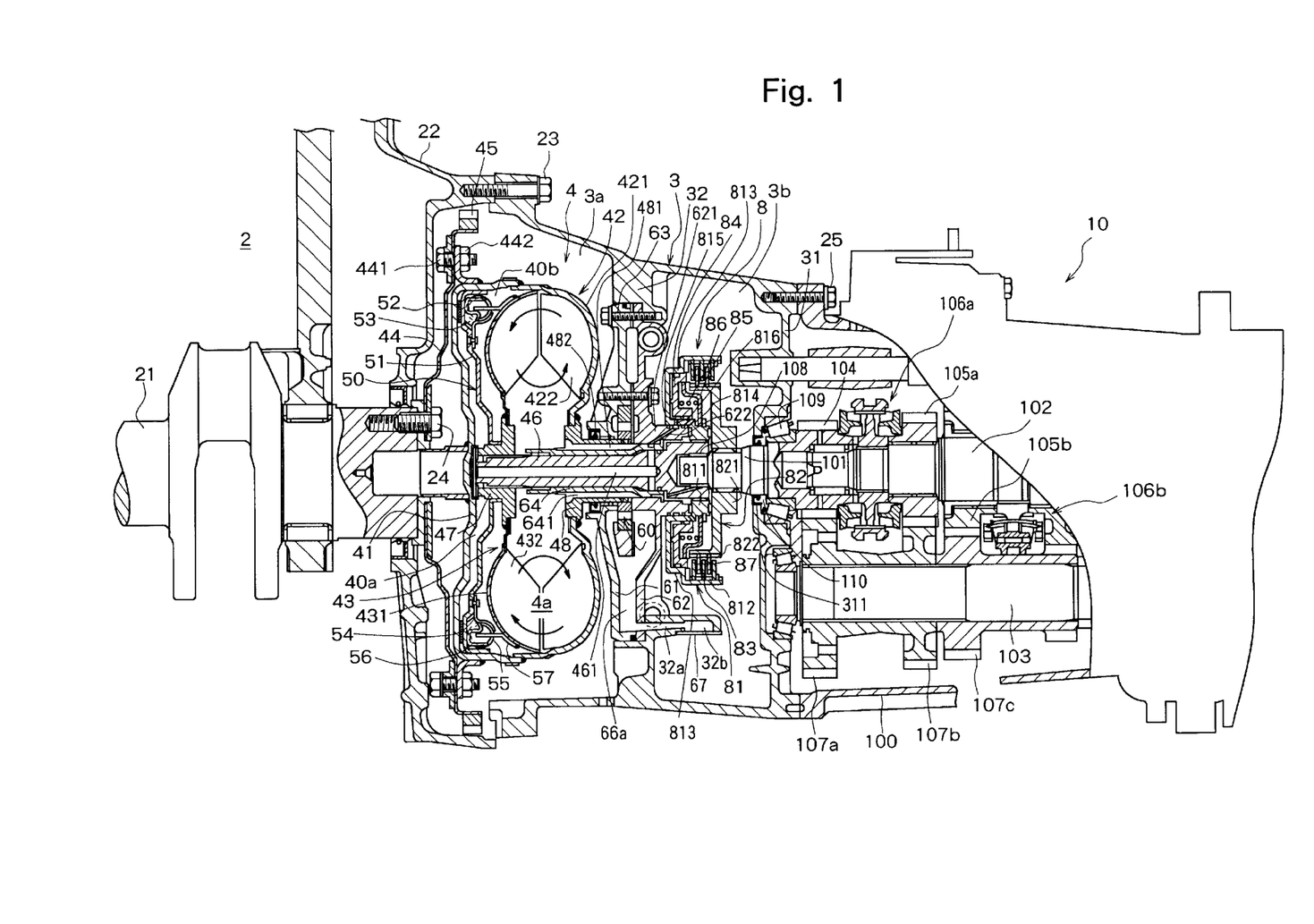
FIG. 1 is a vertical sectional view of a power driving device constituted according to the present invention.

FIG. 1 is a vertical sectional view of a power driving device constituted according to the present invention.

The power driving device shown in FIG. 1 is constituted by a diesel engine 2 that is a prime mover, a fluid coupling 4, a wet-type multi-plate friction clutch 8 and a manual transmission 10, which are arranged in series.

The power driving device in the illustrated embodiment includes a coupling housing 3 for holding the fluid coupling 4 and the wet-type multi-plate friction clutch 8. The coupling housing 3 has one end side which is the engine side (left end side in FIG. 1) that is open and has a partitioning wall 31 on the other end side (right end side in FIG. 1) which is the transmission side. In the illustrated embodiment, the coupling housing 3 is molded as a unitary structure by die-casting aluminum, has an intermediate wall 32 at a central portion in the axial direction, and is partitioned into a fluid coupling-holding chamber 3a and a friction clutch-holding chamber 3b by the intermediate wall 32 and by a pump housing that will be described later. The thus constituted coupling housing 3 is mounted, on the side of the engine 2 (left end side in FIG. 1), to a housing 22 that is mounted on the diesel engine 2 by using a fastening means such as bolts 23, and is mounted, on the transmission side (right end side in FIG. 1), to a case 100 of the manual transmission 10 by using bolts 25. Though the illustrated embodiment has shown the coupling housing 3 that was molded as a unitary structure, the coupling housing 3 may be formed in a divided manner and coupled together.

Figure 2:
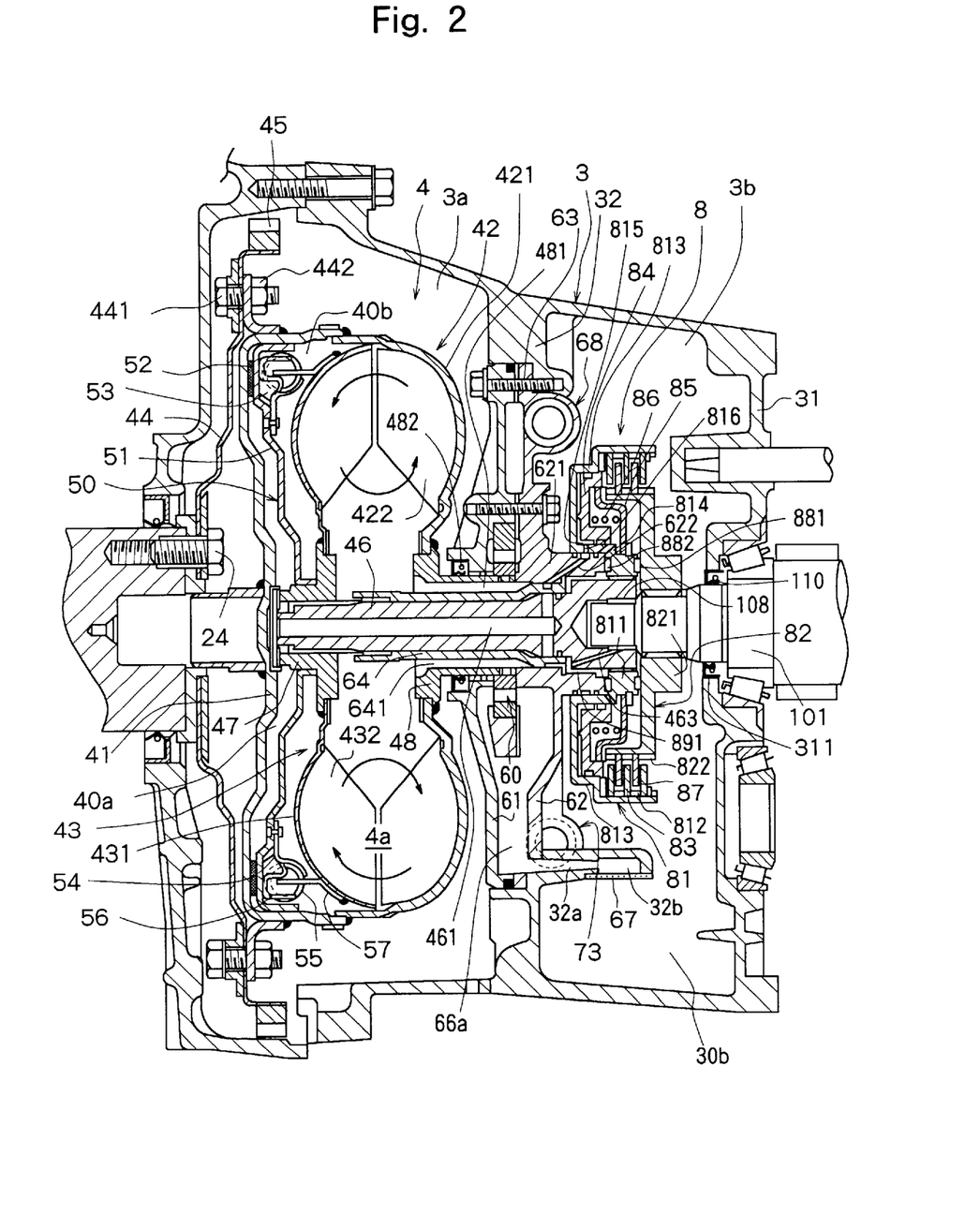
FIG. 2 is a sectional view illustrating, on an enlarged scale, major portions of a power driving device shown in FIG. 1.

Next, the fluid coupling 4 will be described with reference to FIG. 2.

The fluid coupling 4 is placed in the fluid coupling-holding chamber 3a in the coupling housing 3. The fluid coupling 4 in the illustrated embodiment includes a casing 41, a pump 42 and a turbine 43.

The casing 41 is mounted, by a fastening means such as bolts 441 and nuts 442, on the outer circumferential portion of a drive plate 44, of which the inner circumference is mounted to a crank shaft 21 (see FIG. 1) of the diesel engine 2 by using bolts 24. On the outer circumference of the drive plate 44 is mounted a ring gear 45 for a starter, that meshes with a drive gear of a starter motor that is not shown.

The pump 42 is placed being opposite to the casing 41. The pump 42 includes a cup-shaped pump shell 421 and plural impellers 422 radially arranged in the pump shell 421. The pump shell 421 is attached to the casing 41 by a fastening means such as welding. Therefore, the pump shell 421 of the pump 42 is coupled to the crank shaft 21 through the casing 41 and the drive plate 44. Accordingly, the crank shaft 21 works as an input shaft of the fluid coupling 4.

The turbine 43 is placed in a chamber formed by the pump 42 and the casing 41, being opposite to the pump 42. The turbine 43 includes a cup-shaped turbine shell 431 arranged being opposite to the pump shell 421 of the pump 42, and plural runners 432 radially arranged in the turbine shell 431. The turbine shell 431 is mounted, by a fastening means such as welding, on a turbine hub 47 spline-fitted to an output shaft 46 arranged on the same axis as the crank shaft 21 that is the input shaft.

The fluid coupling 4 in the illustrated embodiment includes a lock-up clutch 50 for directly coupling the casing 41 and the turbine 43 together. The lock-up clutch 50 has a clutch disk 51 that is disposed between the casing 41 and the turbine 43 to form an outer chamber 40a relative to the casing 41 and forms an inner chamber 40b relative to the turbine 43. The clutch disk 51 has an inner circumferential edge that can rotate relatively to the outer circumference of the turbine hub 47 and is supported to slide in the axial direction and, further, has, along the outer circumferential portion thereof, a clutch facing 52 mounted on the surface which faces the casing 41. Further, an annular recessed portion 53 is formed on the side of the inner chamber 40b along the outer circumferential portion of the clutch disk 51. In the recessed portion 53 are disposed plural damper springs 55 supported by support pieces 54, at a predetermined distance. Input-side retainers 56 mounted on the clutch disk 51 are arranged protrudingly on both sides of the plural damper springs 55, and output-side retainers 57 mounted on the turbine shell 431 of the turbine 43 are arranged protrudingly among the damper springs 55.

The lock-up clutch 50 of the illustrated embodiment is constituted as described above. Described below is its operation.

The clutch disk 51 is pushed leftward in FIG. 1 when the pressure of the operation fluid on the side of the inner chamber 40b is higher than the pressure of the operation fluid in the outer chamber 40a, i.e., when the operation fluid fed by a fluid operation means 6 that will be described later flows into the outer chamber 40a from the operation chamber 4a formed by the pump 42 and the turbine 43, through the inner chamber 40b. Therefore, the clutch facing 52 mounted on the clutch disk 51 is pushed onto the casing 41 so as to be frictionally engaged therewith (lock-up clutch is connected). Accordingly, the casing 41 and the turbine 43 are directly coupled together through the clutch facing 52, clutch disk 51, input-side retainers 56, damper springs 55 and output-side retainers 57. The clutch disk 51, on the other hand, is pushed rightward in FIG. 1 when the pressure of the operation fluid of the outer chamber 40a is higher than the pressure of the operation fluid on the side of the inner chamber 40b, i.e., when the operation fluid fed by the fluid operation means 6 that will be described later circulates from the outer chamber 40a into the operation chamber 4a formed by the pump 42 and the turbine 43, through the inner chamber 40b. Accordingly, the clutch facing 52 mounted on the clutch disk 51 does not come into frictional engagement with the casing 41 (lock-up clutch is disconnected), and the drive coupling between the casing 41 and the turbine 43 is disconnected.

Pump housings 61 and 62 are mounted on the intermediate wall 32 of the coupling housing 3 by fastening means such as bolts 63. Therefore, the pump housings 61 and 62 work to partition the fluid coupling-holding chamber 3a from the friction clutch-holding chamber 3b that are formed in the coupling housing 3. In the pump housings 61, 62 is disposed a hydraulic pump 60 which is a source of hydraulic pressure for the fluid operation means 6 that will be described later. In the pump housings 61, 62 are further disposed control valves constituting the fluid operation means 6 that will be described later, and is also formed an operation fluid passage. The hydraulic pump 60 disposed in the pump housings 61, 62 is rotatively driven by a pump hub 48 that is rotatably supported, via a bearing 481, by the pump housing 61 mounted on the pump shell 421 of the pump 42. In the pump housings 61, 62 is further formed an intake passage 66a communicated with an intake port of the hydraulic pump 60. The intake passage 66a is communicated with a suction passage 32a formed in the intermediate wall 32 of the coupling housing 3. The suction passage 32a is formed in the coupling housing 3 as a unitary structure, and a suction port 32b is opened toward the bottom wall of the friction clutch-holding chamber 3b. A filter 67 is fitted to the suction port 32b.

In the illustrated embodiment, an operation fluid is contained in a fluid reservoir portion 30b defined in the bottom of the friction clutch-holding chamber 3b, and is sucked by the operation of the hydraulic pump 60 through the filter 67. Therefore, the fluid reservoir portion 30b in the friction clutch-holding chamber 3b works as a reserve tank for storing the operation fluid. In the illustrated embodiment as described above, the suction passage 32a is formed in the intermediate wall 32 of the coupling housing 3 on which the pump housings 61, 62 are mounted. Therefore, there is no need of separately providing a suction mechanism for sucking the operation fluid contained in the fluid reservoir portion 30b, and the number of parts can be decreased. Further, the junction portions of parts constituting the suction mechanism are only the ones where the intermediate wall 32 of the coupling housing 3 is joined to the pump housings 61, 62. Thus, the number of junction portions is few, and the air is efficiently sucked.

An oil seal 482 is disposed between the outer circumferential surface of the pump hub 48 and an end portion of the pump housing 61. Further, a cylindrical member 64 is disposed between the pump hub 48 and the output shaft 46, and a passage 641 is formed between the cylindrical member 64 and the pump hub 48, the passage 641 being communicated with an operation chamber 4a formed by the pump 42 and the turbine 43 in the fluid coupling 4. The output shaft 46 is provided with a passage 461 for the operation fluid. The passage 461 is opened at its one end on a left end surface of the output shaft 46 so as to be communicated with the outer chamber 40a and is opened at its other end in the outer circumferential surface of the output shaft 46.

Next, the wet-type multi-plate friction clutch 8 will be described with reference to FIG. 2.

The wet-type multi-plate friction clutch 8 is placed in the friction clutch-holding chamber 3b in the coupling housing 3, and includes a clutch outer 81 and a clutch center 82. The clutch outer 81 is formed in the shape of a drum and has, in the inner circumferential portion thereof, a hub 811 that spline-fits to the output shaft 46 of the fluid coupling 4. An internal gear spline 812 is provided on the inner surface of the outer circumferential potion of the clutch outer 81, and plural friction plates 83 are fitted to the internal gear spline 812 so as to slide in the axial direction. An annular cylinder 813 is formed in an intermediate portion of the clutch outer 81, and an inner peripheral wall 814 constituting the annular cylinder 813 is fitted to the outer circumferential surface of a boss portion 621 of the pump housing 62 so as to rotate relatively. A pushing piston 84 is disposed in the annular cylinder 813 to push the friction plates 83 and friction plates 87 that will be described later. A hydraulic pressure chamber 815 formed by the annular cylinder 813 and the pushing piston 84 is communicated with a fluid operation means 6 that will be described later, through a passage 816 formed in the inner circumferential wall 814 that constitutes the annular cylinder 813 and through a passage 622 formed in the boss portion 621 of the pump housing 62. A plate 85 is fitted between the hub 811 of the clutch outer 81 and the pushing piston 84, and a compression coil 86 is disposed between the plate 85 and the pushing piston 84. Therefore, the pushing piston 84 is pushed by the resilient force of the compression coil spring 86 to move toward the left in FIG. 2 at all times.

The clutch center 82 is formed in the shape of a disk and has, in the inner circumferential portion thereof, a hub 821 that is spline-fitted to an input shaft 101 of the transmission 10. An external gear spline 822 is provided on the outer circumferential surface of the clutch center 82, and plural friction plates 87 are fitted to the external spline 822 to slide in the axial direction. Plural friction plates 87 mounted on the clutch center 82 and plural friction plates 83 mounted on the clutch outer 81 are alternatingly arranged. Thrust bearings 881 and 882 are respectively arranged between the hub 821 of the clutch center 82 and the hub 811 of the clutch outer 81 and between the hub 811 of the clutch outer 81 and the boss portion 621 of the pump housing 62.

The wet-type multi-plate friction clutch 8 according to the illustrated embodiment is constituted as described above. In a state shown in FIG. 1 where the operation fluid is not fed to the hydraulic pressure chamber 815 by the fluid operation means 6 that will be described later, the pushing piston 84 is brought to a left position (disengaging position) by the resilient force of the compression coil spring 86. Therefore, the plural friction plates 83 and the plural friction plates 87 are not pushed, i.e., the plural friction plates 83 are not brought into frictional engagement with the plural friction plates 87 and hence, the power is not transmitted from the output shaft 46 of the fluid coupling 4 to the input shaft 101 of the transmission 10. As the operation fluid is fed into the hydraulic pressure chamber 815 by the fluid operation means 6 that will be described later, the pushing piston 84 moves rightward in FIG. 1 against the resilient force of the compression coil spring 86. As a result, the plural friction plates 83 and the plural friction plates 87 are pushed and are brought into frictional engagement with each other. Therefore, the power transmitted to the output shaft 46 of the fluid coupling 4 is transmitted to the input shaft 101 of the transmission 10 through the clutch outer 81, plural friction plates 83, 87 and clutch center 82.

The wet-type multi-plate friction clutch 8 according to the illustrated embodiment is so constituted that the operation fluid that circulates in the fluid coupling 4 is fed by the fluid operation means 6 that will be described later in order to cool the plural friction plates 83 and the plural friction plates 87. A passage 891 is formed between the outer circumferential surface of the output shaft 46 of the fluid coupling 4 and the boss portion 621 of the pump housing 62, and is communicated with the fluid operation means 6 that will be described later. The operation fluid fed into the passage 891 lubricates the spline-fitted portion between the output shaft 46 and the hub 811 of the clutch outer 81, enters into between the output shaft 46 and the hub 821 of the clutch center 82, lubricates the thrust bearing 881 and then, is fed to the plural friction plates 83 and the plural friction plates 87. The operation fluid fed into the passage 891 further lubricates the thrust bearing 882, passes through the passage 817 formed in the clutch outer 81 and is fed to the plural friction plates 83 and the plural friction plates 87. The output shaft 46 of the fluid coupling 4 is provided with a passage 463 that communicates the passage 891 with a support portion that supports the input shaft 101 of the transmission 10. Therefore, the operation fluid fed into the passage 891 passes through the passage 891, lubricates the bearing 108 that rotatably supports the input shaft 101, and further lubricates the spline-fitted portion between the input shaft 101 of the transmission 10 and the hub 821 of the clutch center 82. Thus, the operation fluid that has lubricated or cooled each of portions of the wet-type multi-plate friction clutch 8 is released into the friction clutch-holding chamber 3b and is stored in the fluid reservoir portion 30b that works as a reserve tank.

Figure 3:
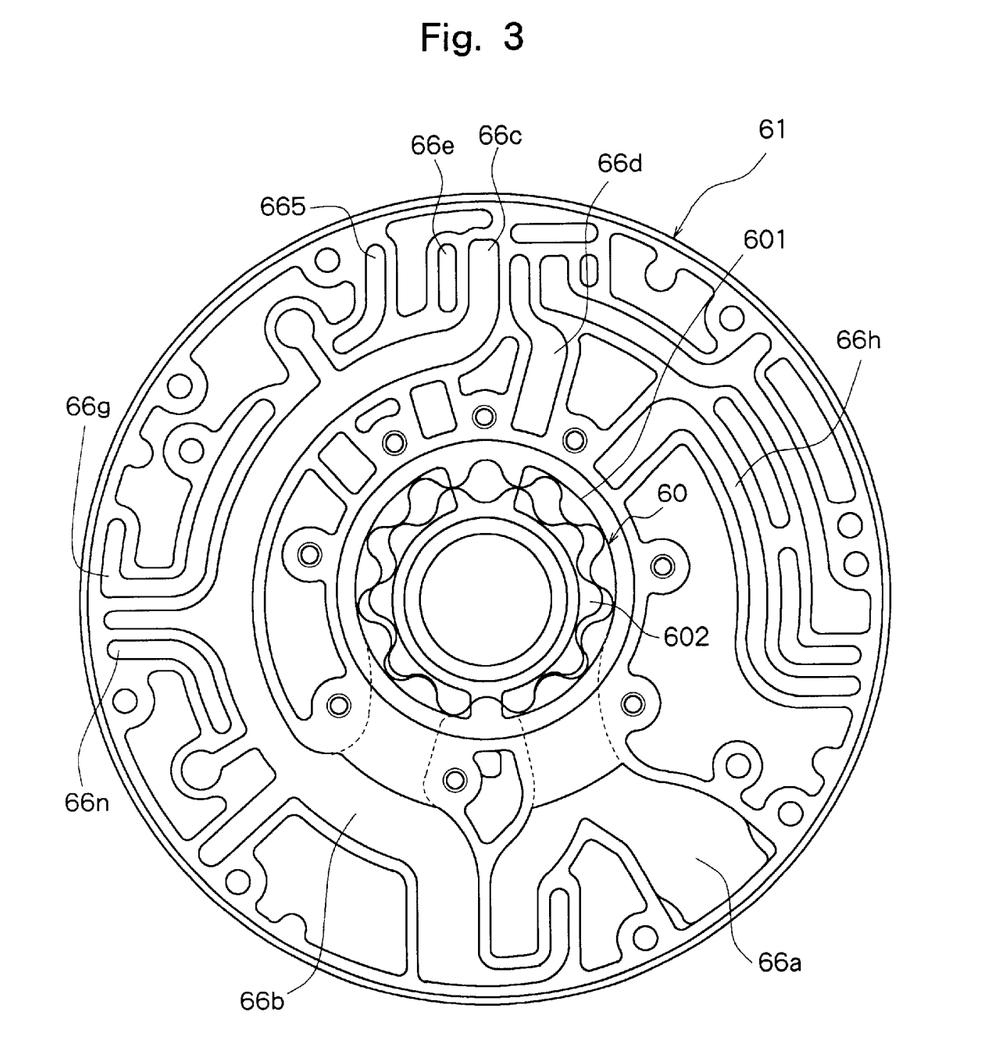
FIG. 3 is a front view illustrating a pump housing constituting a fluid operation means provided in the power driving device of FIG. 1.
Figure 4:
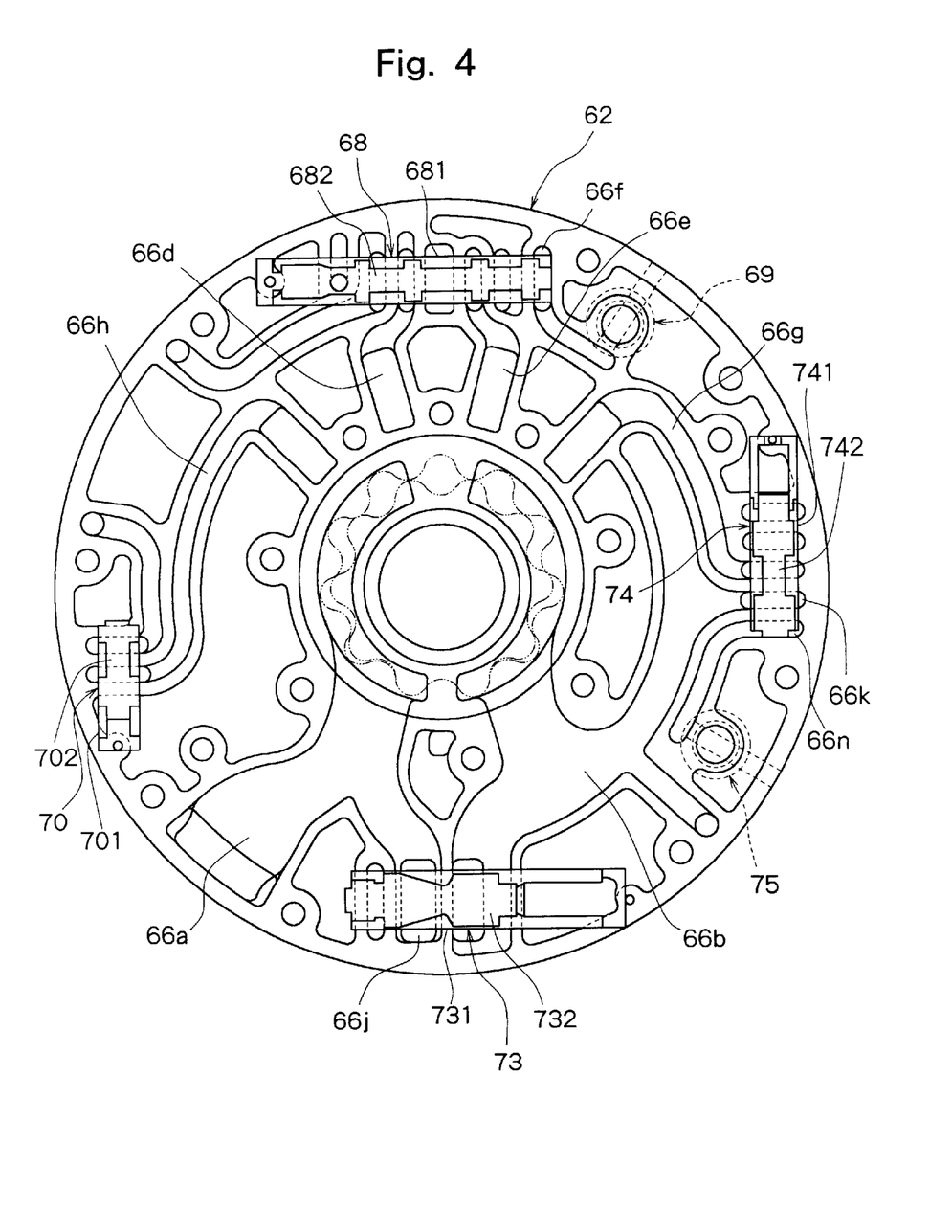
FIG. 4 is a front view illustrating another pump housing constituting a fluid operation means provided in the power driving device of FIG. 1.

Next, the fluid operation means 6 will be described with reference to FIGS. 3 to 5.

The fluid operation means 6 includes the above-mentioned pump housings 61 and 62. In the pump housings 61, 62 are disposed the hydraulic pump 60 that constitutes the fluid operation means 6, and control valves. Further, operation fluid passages are formed therein. The pump housings 61 and 62 are formed in a circular shape as shown in FIGS. 3 and 4, and have the hydraulic pump 60 located at the center thereof. In the illustrated embodiment, the hydraulic pump 60 is a trochoid pump, an outer rotor 601 is arranged in one pump housing 61 on the side of the fluid coupling 4 and an inner rotor 602 is placed in the outer rotor 601. As described above, the hydraulic pump 60 sucks the operation fluid held in the fluid reservoir portion 30b defined in the bottom of the friction clutch-holding chamber 3b through the filter 67, suction passage 32a and intake passage 66a, and blows the operation fluid out into the passage 66b. The operation fluid blown out into the passage 66b is fed into the passage 66d communicated with the passage 461 formed in the output shaft 46 through the passage 66c and the direction control valve 68 for lock-up clutch, or is fed into the passage 66e communicated with the passage 641 that is communicated with the operation chamber 4a in the fluid coupling 4. Referring to FIG. 4, the direction control valve 68 for lock-up clutch is arranged at the outer circumferential portion of the other pump housing 62 on the side of the wet-type multi-plate friction clutch 8, i.e., is arranged on the outer side of the outer circumference of the wet-type multi-plate friction clutch 8 in the radial direction. The direction control valve 68 for lock-up clutch is constituted by a spool valve comprising a cylinder bore 681 formed in the pump housing 62 and a spool 682 slidably disposed in the cylinder bore 681, the cylinder bore 681 having an axial direction which is perpendicular to the radial direction of the pump housing 62.

In order to apply a pilot pressure on the direction control valve 68 for lock-up clutch, a pilot passage 66f is provided for communicating the passage 66b with the direction control valve 68 for lock-up clutch, and an electromagnetic change-over valve 69 for lock-up clutch is provided in the pilot passage 66f. Referring to FIG. 4, the electromagnetic change-over valve 69 for lock-up clutch is disposed in the outer circumferential portion of the other pump housing 62 on the side of the wet-type multi-plate friction clutch 8, and is located on the outer side of the outer circumference of the wet-type multi-plate friction clutch 8 in the radial direction. The electromagnetic change-over valve 69 for lock-up clutch is constituted by a cylinder bore, of which the axial direction is the same as the axial direction of the pump housing 62, and a valve disposed in the cylinder bore. When the traveling speed of the vehicle exceeds a predetermined value, the electromagnetic change-over valve 69 for lock-up clutch is energized (ON) by a control means that is not shown.

Figure 5:
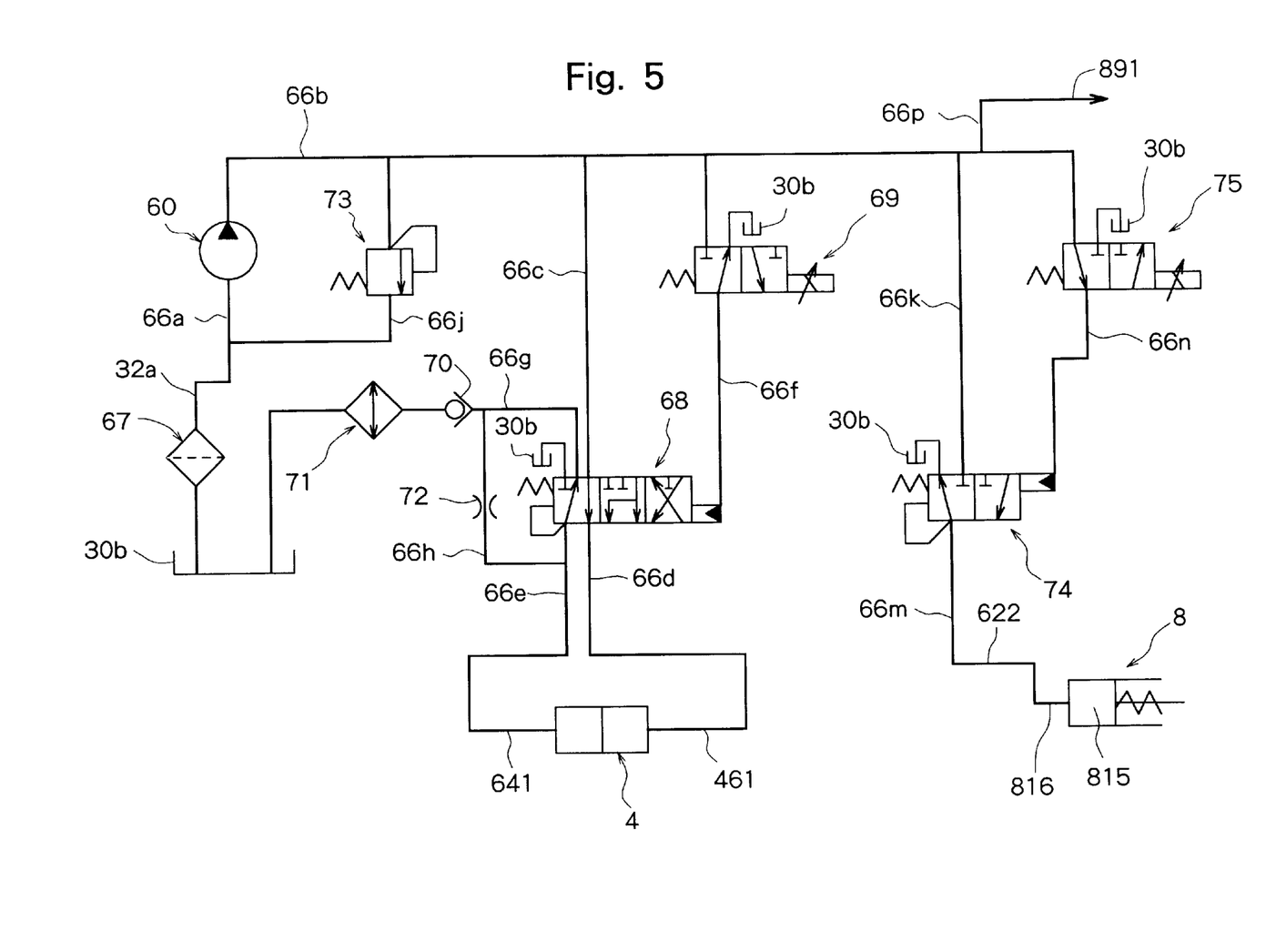
FIG. 5 is a diagram of a fluid circuit of the fluid operation means provided in the power driving device of FIG. 1.

When the electromagnetic change-over valve 69 for lock-up clutch is de-energized (OFF) as shown in FIG. 5, the pilot passage 66f is shut off and no pilot pressure acts on the direction control valve 68 for lock-up clutch. Therefore, the direction control valve 68 for lock-up clutch is positioned in a state shown in FIG. 5, whereby the passage 66c is communicated with the passage 66d, and the passage 66e is communicated with the return passage 66g. As a result, the operation fluid blown out by the hydraulic pump 60 into the passage 66b circulates into the fluid reservoir portion 30b through passage 66c, passage 66d, passage 461, outer chamber 40a of the fluid coupling 4, inner chamber 40b of the fluid coupling 4, operation chamber 4a formed by the pump 42 and the turbine 43 of the fluid coupling 4, passage 641, passage 66e, return passage 66g, check valve 70 disposed in the return passage 66g and cooling unit 71. When the operation fluid circulates as described above, the hydraulic pressure in the outer chamber 40a is higher than the hydraulic pressure in the inner chamber 40b and hence, the lock-up clutch 50 does not come into frictional engagement, as described above (lock-up clutch is disconnected). In the illustrated embodiment, the check valve 70 is placed in the outer circumferential portion of the other pump housing 62 as shown in FIG. 4, and is located on the outer side of the outer circumference of the wet-type multi-plate friction clutch 8 in the radial direction. The check valve 70 is constituted by a spool valve comprising a cylinder bore 701 formed in the pump housing 62 and a spool 702 slidably disposed in the cylinder bore 701. The cylinder bore 701 has an axial direction which is perpendicular to the radial direction of the pump housing 62.

When the electromagnetic change-over valve 69 for lock-up clutch is energized (ON), on the other hand, the pilot passage 66f is communicated and a pilot pressure acts on the direction control valve 68 for lock-up clutch. Therefore, the direction control valve 68 for lock-up clutch is operated to communicate the passage 66c with the passage 66e and to communicate the passage 66d with the fluid reservoir portion 30b. As a result, the operation fluid blown out by the hydraulic pump 60 into the passage 66b circulates into the fluid reservoir portion 30b through passage 66c, passage 66e, passage 641, operation chamber 4a formed by the pump 42 and the turbine 43, inner chamber 40b, outer chamber 40a, passage 461 and passage 66d. When the operation fluid circulates as described above, the hydraulic pressure in the inner chamber 40b is higher than the hydraulic pressure in the outer chamber 40a and hence, the lock-up clutch 50 frictionally engages as described above (lock-up clutch is connected). When the pressure of the operation fluid in the passage 66f is lower than a predetermined value and a low pilot pressure acts on the direction control valve 68 for lock-up clutch in a state where the electromagnetic change-over valve 69 for lock-up clutch has been energized (ON), the spool 682 of the direction control valve 68 for lock-up clutch is brought to an intermediate position, so that the passage 66c is communicated with the passage 66d and with the passage 66e. In relation to this operation, a by-pass 66h is formed to communicate the passage 66e with the return passage 66g, and an orifice 72 is disposed in the by-pass 66h. Therefore, when the rotational speed of the hydraulic pump 60 is low and the pressure of the operation fluid in the passage 66b is lower than the predetermined value, the operation fluid blown into the passage 66b circulates through passage 66c, passage 66e and by-pass 66h equipped with the orifice 72.

The fluid operation means 6 in the illustrated embodiment includes a relief passage 66j for connecting the passage 66a with the passage 66b, and a relief valve 73 is provided in the relief passage 66j. Referring to FIG. 4, the relief valve 73 is placed in the outer circumferential portion of the other pump housing 62 on the side of the wet-type multi-plate friction clutch 8, and is located on the outer side of the outer circumference of the wet-type multi-plate friction clutch 8 in the radial direction. The relief valve 73 is constituted by a spool valve comprising a cylinder bore 731 formed in the pump housing 62 and a spool 732 slidably disposed in the cylinder bore 731. The cylinder bore 731 has an axial direction perpendicular to the radial direction of the pump housing 62. The valve-opening pressure of the relief valve 73 has been set to be, for example, 6 kg/cm$^2$ which is a fluid pressure required for the clutch facing 52 mounted on the clutch disk 51 to be pushed onto the casing 41 to come into frictional engagement with it, when the lock-up clutch 50 is connected. When the pressure of the operation fluid in the passage 66b exceeds 6 kg/cm$^2$, the operation fluid is returned back to the passage 66a through the relief passage 66j.

The fluid operation means 6 in the illustrated embodiment includes a passage 66k and a passage 66m for communicating the passage 66b with the passages 816, 622 communicated with the hydraulic pressure chamber 815 of the wet-type multi-plate friction clutch 8. A direction control valve 74 for friction clutch is placed between the passage 66k and the passage 66m. Referring to FIG. 4, the direction control valve 74 for friction clutch is disposed in the outer peripheral portion of the other pump housing 62 on the side of the wet-type multi-plate friction clutch 8, and is located on the outer side of the outer circumference of the wet-type multi-plate friction clutch 8 in the radial direction. The direction control valve 74 for friction clutch is constituted by a spool valve comprising a cylinder bore 741 formed in the pump housing 62 and a spool 742 slidably disposed in the cylinder bore 741. The cylinder bore 741 has an axial direction perpendicular to the radial direction of the pump housing 62.

In order to apply the pilot pressure on the direction control valve 74 for friction clutch, a pilot passage 66n is provided for communicating the passage 66b with the direction control valve 74 for friction clutch, and an electromagnetic change-over valve 75 for friction clutch is disposed in the pilot passage 66n. Referring to FIG. 4, the electromagnetic change-over valve 75 for friction clutch is disposed in the outer circumferential portion of the other pump housing 62 on the side of the wet-type multi-plate friction clutch 8, and is located on the outer side of the outer circumference of the wet-type multi-plate friction clutch 8 in the radial direction. The electromagnetic change-over valve 75 for friction clutch is constituted by a cylinder bore having the same direction as the axial direction of the pump housing 62 and a valve disposed in the cylinder bore.

When de-energized (OFF), the electromagnetic change-over valve 75 for friction clutch communicates with the pilot passage 66n as shown in FIG. 5 and, when energized (ON), it shuts off the communication with pilot passage 66n. The direction control valve 74 for friction clutch shuts off the communication between the passage 66k and the passage 66m in a state where no pilot pressure acts thereon, and communicates the passage 66k with the passage 66m when the pilot pressure acts thereon. When the electromagnetic change-over valve 75 for friction clutch is de-energized (OFF), therefore, the pilot pressure acts on the direction control valve 74 for friction clutch. Accordingly, the direction control valve 74 for friction clutch makes communication between the passage 66k and the passage 66m. As a result, the operation fluid blown out by the hydraulic pump 60 into the passage 66b is fed into the hydraulic chamber 815 of the wet-type multi-plate friction clutch 8 through passage 66k, passage 66m and passages 622, 816, whereby the pushing piston 84 moves rightward in FIGS. 1 and 2 against the resilient force of the compression coil spring 86 and consequently, the plural friction plates 83 and the plural friction plates 87 are pushed onto each other so as to be frictionally engaged together. When the electromagnetic change-over valve 75 for friction clutch is energized (ON), on the other hand, the communication with the pilot passage 66n is shut off and no pilot pressure acts on the direction control valve 74 for friction clutch. Therefore, the communication between the passage 66k and the passage 66m is shut off, and the passage 66m is opened to the fluid reservoir portion 30b. As a result, the pushing piston 84 of the wet-type multi-plate friction clutch 8 moves leftward in FIGS. 1 and 2 by the resilient force of the compression coil spring 86, and the frictional engagement is released between the plural friction plates 83 and the plural friction plates 87.

The electromagnetic change-over valve 75 for friction clutch is energized (ON) or de-energized (OFF) by a control means that is not shown, at the time of speed-change conducted in the manual transmission 10. That is, the wet-type multi-plate friction clutch 8 according to the illustrated embodiment constitutes an automatic clutch system, and the control means (not illustrated) energizes (ON) the electromagnetic change-over valve 75 for friction clutch in response to a signal that is output when a speed-change instruction switch mounted on a speed-change lever (not shown) is turned on by a driver who operates the manual transmission 10 to change the speed, whereby transmission of power through the wet-type multi-plate friction clutch 8 is shut off. At the time when the shifting operation of the transmission has terminated, the control means that is not shown de-energizes (OFF) the electromagnetic change-over valve 75 for friction clutch in response to a shift end signal from a shift stroke sensor that is not shown, so that the wet-type multi-plate friction clutch 8 is brought into frictional engagement.

The fluid operation means 6 in the illustrated embodiment has a passage 66p for communicating the passage 66b with a passage 891 formed between the outer circumferential surface of the output shaft 46 of the fluid coupling 4 and the boss portion 621 of the pump housing 62. Therefore, the operation fluid blown by the hydraulic pump 60 into the passage 66b is fed at all times into the passage 891 through the passage 66p. When the hydraulic pump 60 is in operation, therefore, the operation fluid fed into the passage 891 lubricates the spline-fitted portion and the bearings as described above, and is further fed to the plural friction plates 83 and to the plural friction plates 87 of the wet-type multi-plate friction clutch 8. Thus, the fluid operation means 6 allowing the operation fluid to circulate into the fluid coupling 4 lubricates the bearings of the wet-type multi-plate friction clutch 8 and feeds the operation fluid as a cooling liquid to the plural friction plates 83 and to the plural friction plates 87. Therefore, there is no need of separately providing a cooling liquid feeding device for cooling the friction plates of the wet-type multi-plate friction clutch 8. Besides, since the operation fluid in the fluid coupling 4 fed to the friction plates has good friction characteristics, good friction clutch characteristics can be maintained.

In the illustrated embodiment, the fluid operation means 6 is constituted as described above, and in the pump housings 61 and 62 are disposed the hydraulic pump 60, direction control valve 68 for lock-up clutch, electromagnetic change-over valve 69 for lock-up clutch, check valve 70, relief valve 73, direction control valve 74 for friction clutch and electromagnetic change-over valve 75 for friction clutch as well as the operation fluid passages, making it possible to constitute the fluid operation means as a whole in a compact size. In the illustrated embodiment, further, the direction control valve 68 for lock-up clutch, electromagnetic change-over valve 69 for lock-up clutch, check valve 70, relief valve 73, direction control valve 74 for friction clutch and electromagnetic change-over valve 75 for friction clutch are arranged in the outer circumferential portions of the other pump housing 62 on the side of the wet-type multi-plate friction clutch 8 and are located on the outer side of the outer circumference of the wet-type multi-plate friction clutch 8 in the radial direction. It is therefore allowed to shorten the length in the axial direction of the power driving device as a whole. That is, if the valves are disposed in the pump housing 62, the valves in the pump housing 62 protrude on the side of the wet-type multi-plate friction clutch 8. Namely, if the valves are disposed on the inner side of the outer circumference of the wet-type multi-plate friction clutch 8 in the radial direction, the wet-type multi-plate friction clutch 8 must be so disposed as will not interfere with the valve portions, and the length of the power driving device as a whole increases in the axial direction. Therefore, the weight of the whole device increases and hence, causes a problem from the standpoint of mounting on a vehicle. In the illustrated embodiment, however, the valves are disposed on the outer side of the outer circumference of the wet-type multi-plate friction clutch 8 in the radial direction and do not interfere with the wet-type multi-plate friction clutch 8. This, therefore, makes it possible to dispose the wet-type multi-plate friction clutch 8 at a position as close to the pump housing 62 as possible. Thus, it is allowed to shorten the length the power driving device as a whole in the axial direction, and to decrease the weight of the device as a whole, making the device well for being mounted on the vehicle.

In the illustrated embodiment, further, the cylinder bores of the direction control valve 68 for lock-up clutch, check valve 70, relief valve 73 and direction control valve 74 for friction clutch are so formed as to have axial directions perpendicular to the radial direction of the pump housing 62. The cylinder bores are machined by using a drill. Since their axial directions are perpendicular to the radial direction of the pump housing 62, it is allowed to machine the cylinder bores by turning the pump housing 62 to predetermined positions without changing the angle of mounting the drill.

Next the manual transmission 10 will be described with reference to FIG. 1.

The manual transmission 10 in the illustrated embodiment is a parallel shaft-type gear transmission which includes a case 100, an input shaft 101 disposed in the case 100 and having the clutch center 82 of the wet-type multi-plate friction clutch 8, an output shaft 102 disposed on the same axis as the input shaft 101, and a counter shaft 103 disposed in parallel with the output shaft 102. A drive gear 104 is arranged on the input shaft 101. On the output shaft 102 are arranged rear-axle drive gears 105a, 105b, . . . and synchromesh devices 106a, 106b, . . . . On the counter shaft 103 are provided counter gears 107a, 107b, 107c, . . . that mesh with the drive gear 104 and the rear-axle drive gears 105a, 105b, . . . at all times. The input shaft 101 is disposed penetrating through a hole 311 formed in a partitioning wall 31 of the coupling housing 3, and its one end is rotatably supported by the output shaft 46 of the fluid coupling 4 via a bearing 108, and an intermediate portion thereof is rotatably supported by the coupling housing 3 via a bearing 109. An oil seal 110 is disposed between the input shaft 101 and the inner circumferential surface of the hole 311 formed in the partitioning wall 31 of the coupling housing 3. The oil seal 110 prevents the clutch-cooling fluid in the friction clutch-holding chamber 3b of the coupling housing 3 from infiltrating into the case 100 of the manual transmission 10, and prevents the lubricating oil in the case 100 of the manual transmission 10 from infiltrating into the friction clutch-holding chamber 3b.

The power driving device for vehicles according to the illustrated embodiment is constituted as described above. Described below is the operation.

First, described below is the operation for starting the vehicle.

In a state where the diesel engine 2 is started up and is idling, the electromagnetic change-over valve 75 for friction clutch is de-energized (OFF) and the wet-type multi-plate friction clutch 8 is brought into frictional engagement as described above. The electromagnetic change-over valve 69 for lock-up clutch is de-energized (OFF), and the lock-up clutch 50 of the fluid coupling 4 is not brought into frictional engagement (lock-up clutch is disconnected) as described above. Therefore, the engine 2 maintains its idling state owing to the slipping of the fluid coupling 4. When a driver turns on the speed-change instruction switch mounted on the speed-change lever (not shown) to start the vehicle, the electromagnetic change-over valve 75 for friction clutch is energized (ON) as described above, and the transmission of power through the wet-type multi-plate friction clutch 8 is shut off. While the transmission of power through the wet-type multi-plate friction clutch 8 has been shut off, the speed-change operation is effected by using the speed-change lever, and when the manual transmission 10 is set to the start gear, the electromagnetic change-over valve 75 for friction clutch is de-energized (OFF) and the wet-type multi-plate friction clutch 8 is brought into frictional engagement. In this state, when an accelerator pedal is depressed to increase the rotational speed of the engine, the drive force generated on the crank shaft 21 (input shaft) of the diesel engine 2 is transmitted to the casing 41 of the fluid coupling 4 through the drive plate 44 as described earlier. Since the casing 41 and the pump shell 421 of the pump 42 is constituted as a unitary structure, the pump 42 is rotated by the drive force. As the pump 42 rotates, the operation fluid in the pump 42 flows toward the outer circumference along the impeller 422 due to the centrifugal force and flows in to the side of the turbine 43 as indicated by an arrow. The operation fluid that has flown in to the side of the turbine 43 flows toward the center side and is returned back to the pump 42 as indicated by an arrow. Thus, as the operation fluid in the operation chamber 4a formed by the pump 42 and the turbine 43 circulates in the pump 42 and in the turbine 43, the drive torque on the side of the pump 42 is transmitted to the side of the turbine 43 through the operation fluid. The drive force transmitted to the side of the turbine 43 is transmitted to the output shaft 46 through the turbine shell 431 and the turbine hub 47, and is further transmitted to the transmission 10 through the wet-type multi-plate friction clutch 8 to start the vehicle.

Next, described below is the function at the time of speed-change of the power driving device for vehicles.

To change the manual transmission 10 into a predetermined speed while the vehicle is traveling, the driver turns on the speed-change instruction switch mounted on the speed-change lever that is not shown. Then, the electromagnetic change-over valve 75 for friction clutch is energized (ON) and the transmission of power through the wet-type multi-plate friction clutch 8 is shut off, as described above. While the transmission of power by the wet-type multi-plate friction clutch 8 has been shut off, the speed-change operation is effected by using the speed-change lever, and the manual transmission 10 is set to the predetermined speed. At this occasion, the rotational speed of the output shaft 102 is brought into synchronism with the rotational speed of the predetermined rear-axle drive gear 105 by the synchromesh device 106. This synchronizing action requires an extended period of time when the members constituting the friction clutch coupled to the rear-axle drive gear 105 has a large inertia of rotation (when the synchronizing load is large), while the synchronizing action can be done in a short period of time when the inertia of rotation is small (when the synchronizing load is small). In the illustrated embodiment, however, the clutch center 82 having a small inertia of rotation (having a small synchronizing load) is mounted on the input shaft 101 that is coupled to the rear-axle drive gear 105. Therefore, the synchronizing action is accomplished within a short period of time to allow the speed to be changed within a short period of time.

When the transmission has been shifted to the predetermined speed as a result of bringing the rotational speed of the output shaft 102 into synchronism with the rotational speed of the predetermined rear-axle drive gear 105 as described above, the electromagnetic change-over valve 75 for friction clutch is de-energized (OFF), and the wet-type multi-plate friction clutch 8 is brought into frictional engagement.

Though the invention was described above by way of an embodiment, it should be noted that the invention is in no way limited to the above embodiment only. For example, the direction control valve 68 for lock-up clutch and the direction control valve 74 for friction clutch used in the illustrated embodiment were the ones of a type that operates according to the application of a pilot pressure. They, however, may be electromagnetic valves. In this case, it is allowed to omit the electromagnetic change-over valve 69 for lock-up clutch, electromagnetic change-over valve 75 for friction clutch and pilot passages 66*f* and 66*n*.

Being constituted as described above, the power driving device of the present invention exhibits actions and effects as described below.

That is, according to the present invention, the pump housing which constitutes the fluid operation means for circulating the operation fluid into the fluid coupling and for feeding the operation fluid to the wet-type friction clutch is such that there is disposed a hydraulic pump working as a source of hydraulic pressure, there are formed passages for communicating the hydraulic pump with the fluid coupling and with the wet-type friction clutch, and there are disposed a relief valve for adjusting the pressure of the operation fluid blown out from the hydraulic pump, a control valve for changing over the passage communicated with the fluid coupling and a control valve for changing over the passage communicated with the wet-type friction clutch. Accordingly, the fluid operation means as a whole is constituted in a compact size without using piping such as pipes.

According to the present invention, further, the relief valve and the control valves are disposed in the outer circumferential portions of the pump housing on the outer side of the outer circumference of the wet-type friction clutch in the radial direction. Therefore, the valves do not interfere with the wet-type multi-plate friction clutch, enabling the wet-type multi-plate friction clutch to be disposed at a position as close to the pump housing as possible. This makes it possible to shorten the length in the axial direction of the power driving device as a whole and to decrease the weight of the whole device, making the device well for being mounted on the vehicle.

According to the present invention, further, the relief valve and the control valves are constituted by spool valves comprising cylinder bores and spools slidably disposed in the cylinder bores, the cylinder bores being so formed that the axial directions thereof are perpendicular to the radial direction of the pump housing. Therefore, the cylinder bores can be machined by using a drill without changing the angle of mounting the drill but by turning the pump housing to predetermined positions.

What we claim is:

1. A power driving device comprising a fluid coupling having a pump operated by an engine and a turbine disposed being opposite to said pump, a wet-type friction clutch placed between said fluid coupling and a transmission, and a fluid operation means for circulating the operation fluid through said fluid coupling and for feeding the operation fluid to said wet-type friction clutch, said power driving device further comprising:

a coupling housing including a fluid coupling-holding chamber in which said fluid coupling is disposed and a friction clutch-holding chamber in which said friction clutch is disposed; and a pump housing disposed in said coupling housing to partition said fluid coupling-holding chamber from said friction clutch-holding chamber;

wherein, in said pump housing, there is disposed a hydraulic pump that is driven by said pump of said fluid coupling and works as a source of hydraulic pressure for said fluid operation means, there are formed passages for communicating said hydraulic pump with said fluid coupling and with said wet-type friction clutch, and there are disposed a relief valve for adjusting the pressure of the operation fluid blown out from the hydraulic pump, a control valve for changing over the passage communicated with said fluid coupling and a control valve for changing over the passage communicated with said wet-type friction clutch.

2. A power driving device according to claim 1, wherein said relief valve and said control valves are disposed in the outer circumferential portions of the pump housing on the outer side of the outer circumference of the wet-type friction clutch in the radial direction.

3. A power driving device according to claim 1, wherein said relief valve and said control valves are constituted by spool valves comprising cylinder bores and spools slidably disposed in the cylinder bores, the cylinder bores being so formed that the axial directions thereof are perpendicular to the radial direction of the pump housing.

* * * * *